J. ROSENBAUM.
LOCKING DEVICE FOR VEHICLE WHEEL RIM FLANGES.
APPLICATION FILED SEPT. 22, 1913.
1,116,125.
Patented Nov. 3, 1914.
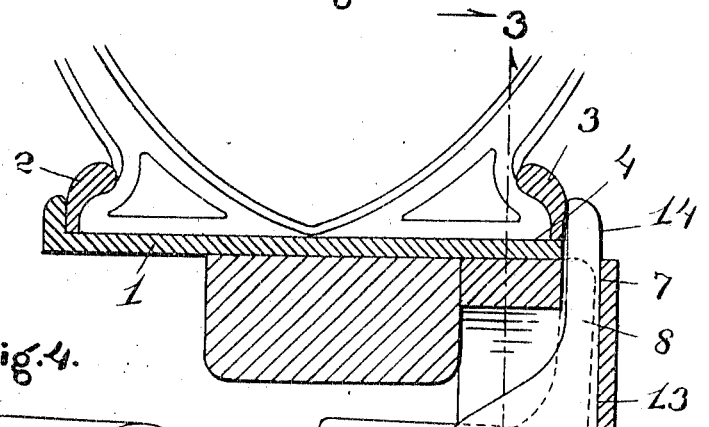
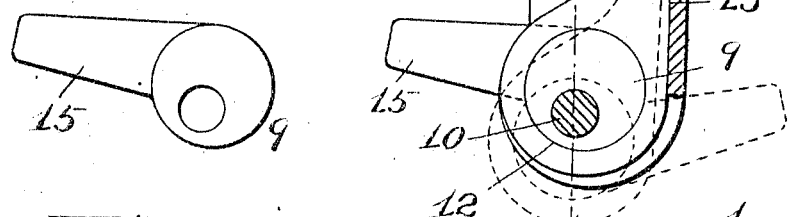
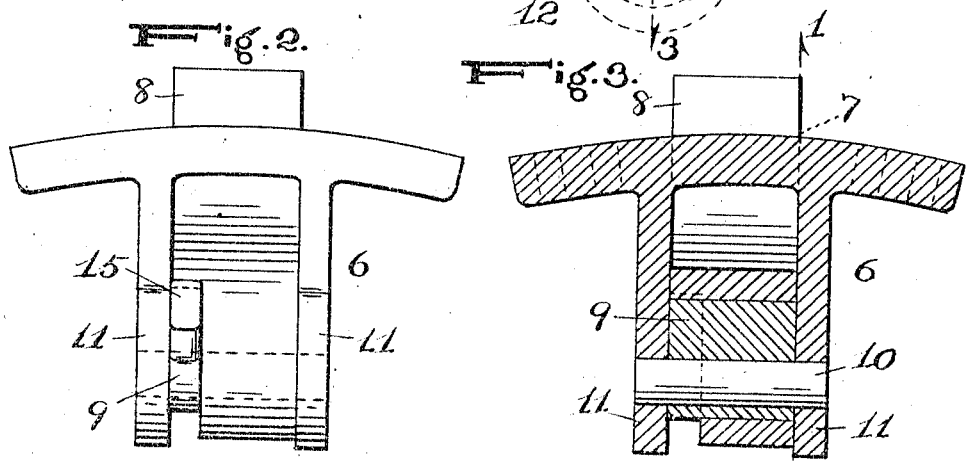
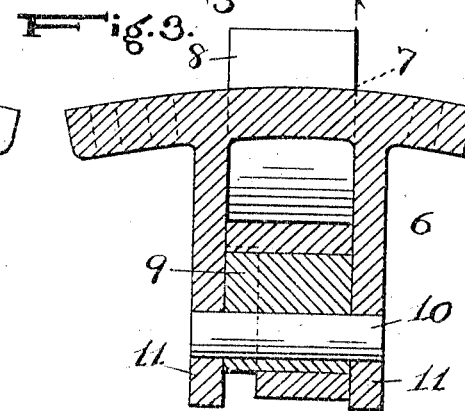
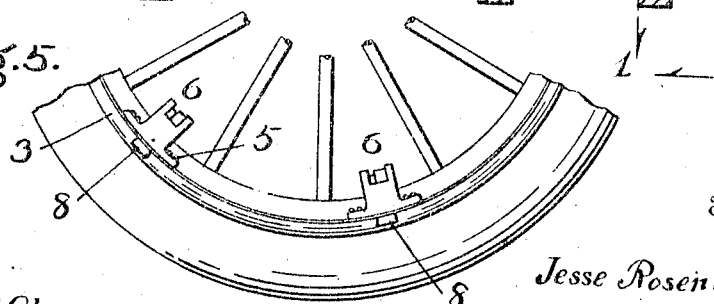
Inventor
Jesse Rosenbaum
Witnesses
Stuart Hilder.
Frances W. Anderson.
By
E. W. Anderson & Son
his Attorneys

UNITED STATES PATENT OFFICE.

JESSE ROSENBAUM, OF MOUNT VERNON, INDIANA.

LOCKING DEVICE FOR VEHICLE WHEEL-RIM FLANGES.

1,116,125.  Specification of Letters Patent.  Patented Nov. 3, 1914.

Application filed September 22, 1913. Serial No. 791,121.

*To all whom it may concern:*

Be it known that I, JESSE ROSENBAUM, a citizen of the United States, resident of Mount Vernon, in the county of Posey and State of Indiana, have made a certain new and useful Invention in Locking Devices for Vehicle Wheel-Rim Flanges; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a section on the line 1—1, Fig. 3, and shows the device as applied to the rim of a vehicle wheel, also shown in section, the released positions of parts being shown in dotted lines. Fig. 2 is an inside face view of the invention. Fig. 3 is a section on the line 3—3, Fig. 1. Fig. 4 is a detail side view of one of the eccentrics and its lever handle. Fig. 5 is a side view of a portion of a wheel having the invention applied thereto.

The invention has relation to locking devices for the detachable tire retaining flanges of vehicle wheels, designed to facilitate the removal of the flange and of the tire from a wheel, and the locking in place of the tire upon the wheel.

The invention consists in the novel construction and combinations of parts as hereinafter set forth.

In the accompanying drawings illustrating the invention, the numeral 1, designates the rim or felly of the wheel, having at its inner side the tire retaining flange 2, and at its outer side the detachable tire retaining flange or ring 3, said felly having a flat outer circumferential surface 4, without groove or shoulder that will obstruct the removal of the detachable flange or of the tire.

Secured to the felly usually by bolts or screws 5, are a plurality of attachments or casings 6, separated by suitable intervals, and having each a radial slot 7, engaged by a radially reciprocating clamping member or locking bolt 8, designed to overlap the detachable flange 3 to hold it in position against the tire in place upon the wheel, said bolt being capable of withdrawal in the slot to allow removal of the flange and of the tire.

Each of the locking bolts is operated by suitable means preferably an eccentric or cam 9, having end journals 10, mounted in the branches 11 of the casing or carrier, said eccentric engaging a circular perforation 12 of the bolt, which acts as the eccentric strap.

Each of the casings is provided with an inner flat face 13, against which bears the outer flat face or edge 14, of the bolt or clamping member when in locking position, the eccentric in locking position being turned or inclined outwardly short of its full lateral throw, so that any strain of the tire upon the detachable flange tending to tire displacement, will press the outer flat face or edge of the bolt all the more securely against the flat face of the casing to maintain the locking engagement. Each eccentric is provided with a suitable handle 15.

The invention is designed for convenient attachment to wheels now in use without perforation or slotting of the felly or rim base. When the locking bolts are released they will remain in released position owing to the comparative weight and the friction of the parts.

What I claim is:—

1. In a vehicle wheel, the combination with a felly, a tire rim and a laterally movable tire retaining ring, of an attachment having a flat inner face, a rotary cam mounted in said attachment and having its longitudinal axis parallel with the plane of the wheel, said cam having movement in a plane at right-angles to that of the wheel, and a radially movable clamping member upon said cam and overlapping said retaining ring to lock said ring in position, said member being provided with a flat outer face having in locking position bracing engagement with the flat inner face of said attachment.

2. In a vehicle wheel, the combination with a felly, a tire rim and a laterally movable tire retaining ring, of an attachment having a radial slot and a flat inner face, a rotary cam mounted in said attachment and having its longitudinal axis parallel with the plane of the wheel, said cam having movement in a plane at right angles to that of the wheel, and a radially movable clamping member upon said cam and overlapping said retaining ring to lock said ring in position, said member being provided with a flat outer face having in locking position bracing engagement with the flat inner face of said attachment, said cam in locking position being inclined outwardly of the wheel, short of its full lateral throw, and the outer face of said member being in released position spaced apart from said inner face of the attachment.

In testimony whereof I affix my signature, in presence of two witnesses.

JESSE ROSENBAUM.

Witnesses:
  LEE ROSENBAUM,
  PERCY W. SEITZ.